March 10, 1925.  1,529,016

J. DUDLEY

VEHICLE WHEEL

Filed April 28, 1923    2 Sheets-Sheet 1

INVENTOR.
Job Dudley
BY
Thos. S. Donnelly
ATTORNEY.

March 10, 1925.  J. DUDLEY  1,529,016
VEHICLE WHEEL
Filed April 28, 1923   2 Sheets-Sheet 2
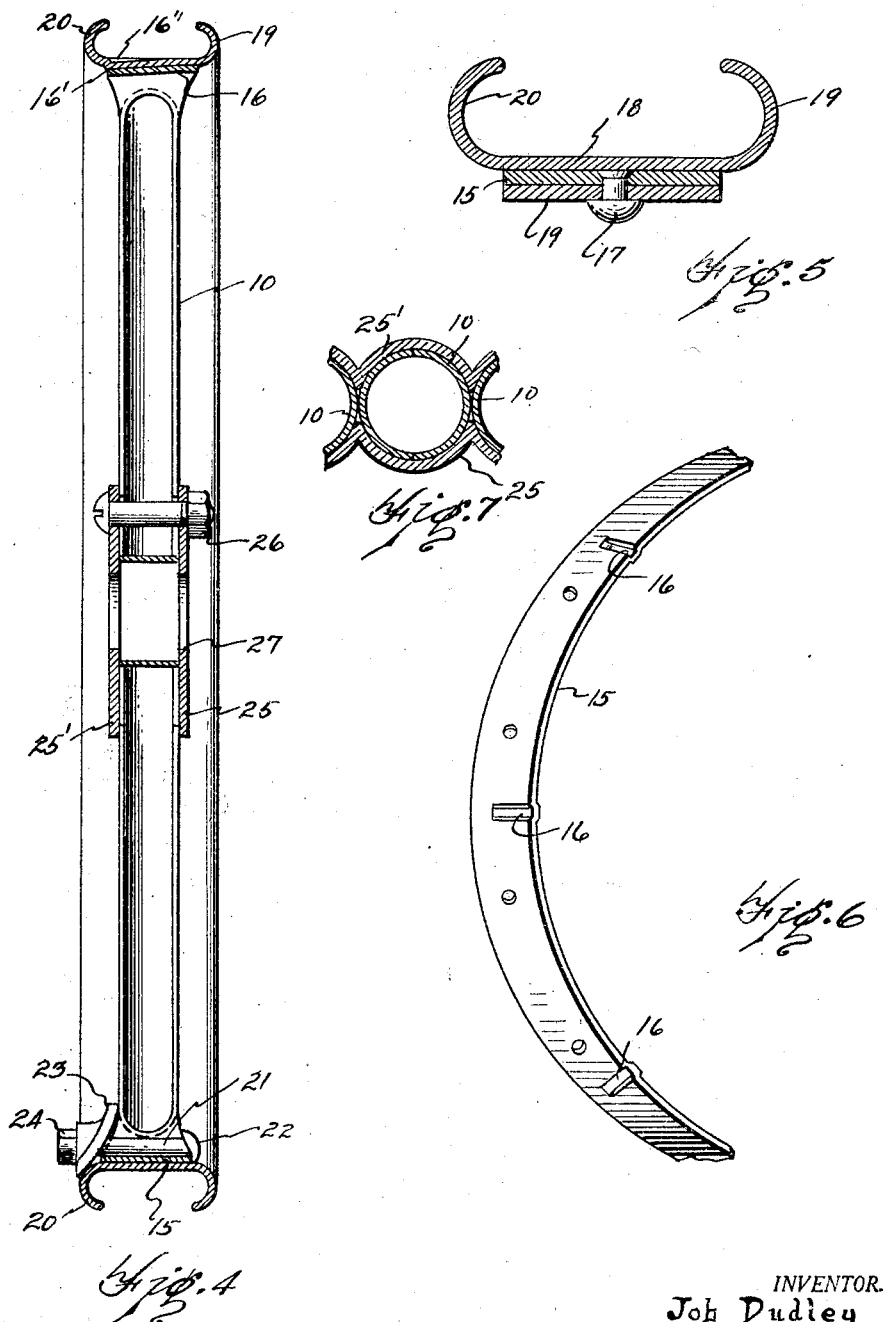
INVENTOR.
Job Dudley
BY
Thos. L. Donnelly
ATTORNEY.

Patented Mar. 10, 1925.

1,529,016

UNITED STATES PATENT OFFICE.

JOB DUDLEY, OF DETROIT, MICHIGAN.

VEHICLE WHEEL.

Application filed April 28, 1923. Serial No. 635,219.

*To all whom it may concern:*

Be it known that I, JOB DUDLEY, a former subject of the King of England, who have declared my intention of becoming a citizen of the United States, residing at Detroit, in the county of Wayne and State of Michigan, have invented a new and useful Improvement in a Vehicle Wheel, of which the following is a description.

My invention relates to a new and useful improvement in vehicle wheels and has for its object the provision of a vehicle wheel having the spokes thereof formed from one continuous strip of material.

Another object of the invention is the provision of a vehicle wheel having the spokes formed from one continuous strip of material and connected together.

Another object of the invention is the provision of a vehicle wheel having metal spokes which are connected together by forming the same with a continuous strip of metal and having the connecting portion extending between the spokes serving as a rest for the felly of the wheel.

Another object of the invention is the provision of a vehical wheel adapted for the reception of a tire retainer and so constructed as to permit the slipping of the tire retainer onto the felly from one side and provided with means limiting the amount of thrust of the tire retainer on the felly and with means for preventing the undue removal of the tire retainer from the felly.

Another object of the invention is the provision of a vehicle wheel having the spokes thereof made from a single strip of material and so arranged as to be connected at their outer ends and converging at their inner ends so as to approach each other closely, to provide at their inner ends an opening for the reception of the axle of the vehicle.

Other objects will appear hereinafter.

The invention consists in the combinations and arrangements of parts hereinafter described and claimed.

Figure 1:
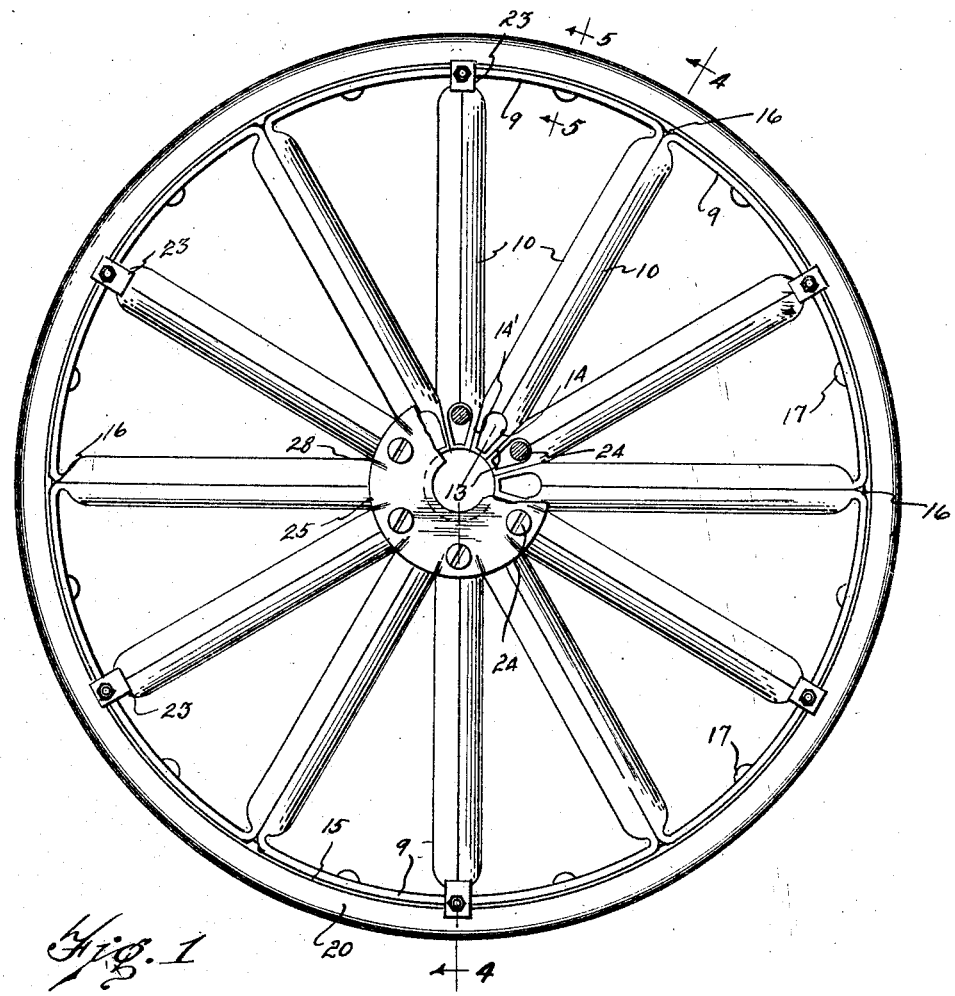
Figure 2:
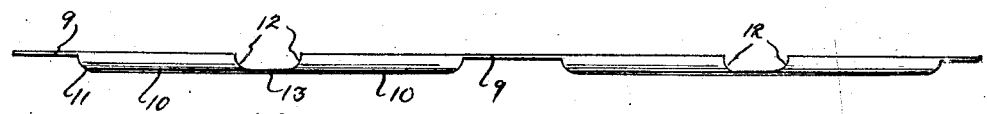
Figure 3:
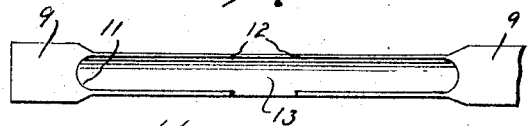

The invention will be best understood from a reference to the accompanying drawings which form a part of this specification and in which, Fig. 1 is a side elevational view of the invention, Fig. 2 is a side elevational view of the blank used in forming the wheel, partly swaged to form, Fig. 3 is a top plan view of the blank used in the invention partly swaged to form, Fig. 4 is a sectional view taken on substantially line 4—4 of Fig. 1, Fig. 5 is a sectional view taken on substantially line 5—5 of Fig. 1, and, Fig. 6 is a fragmentary perspective view of the felly used with the invention.

Fig. 7 is a fragmentary sectional view illustrating the relation of the plate and the spoke in the invention.

The invention in its preferred form is made from a blank of metal having the flat portions 9 which connect the portions 10 which are swaged to any desirable form. In the form shown in the drawings I have shown the spokes formed substantially cylindrical but the particular form of the spokes is a matter of choice with the builder. As shown the portions 10 are formed trough shaped with side walls which terminate at the end adjacent the portions 9 in a gradual slope 11 and at the ends adjacent the connecting portions 13 in an arcuate form 12. As shown in Fig. 3 the portions 9 are wider than the portions 13, the portions 9 being of the width of the rim or felly of the wheel and the portions 13 being made narrower to allow the spokes to converge at the center of the wheel, the center of the wheel generally being narrower in cross section than the felly of it. When the strip of metal is swaged from a straight blank to the form shown in Figs. 2 and 3 the portions 10 are bent over a form to provide an opening 14 and to present a suitable angle on the sides 14' so that adjacent spokes may lie in the proper position at their inner ends to form a substantially uninterrupted opening at the ends through which the axle of the vehicle may project. In this way the adjacent portions 10 are folded upon each other to form the spoke of the wheel. The portions 9 are then bent over a form to connect the adjacent spokes at their outer ends. When the proper number of spokes have been formed and placed in assembled relation in this manner the ends of the strip are then welded or otherwise secured together so that the spokes of the wheel are then formed from a substantially continuous piece of material. A felly 15 is formed from a strip of metal and the ends thereof are welded together or otherwise suitably joined together. At intervals the felly is provided with a pocket or recess 16 which is formed therein by pressing a shoulder out on the inner surface thereof. These pockets are deeper at their open or outer end than at their inner or closed end, the slope being gradual, as shown in Fig. 4. The portions 9 are connected to the felly 15, between the spokes, by means of a suitable bolt or rivet 17. Used with the felly is a tire retaining rim 18 which is provided at each side with tire clenching flanges 19 and 20. The rim is provided at intervals with shoulders 16' formed on the inner surface thereof by pressing pockets 16'' into the outer surface thereof, the distance between said shoulders corresponding to the distance between the recesses 16. These shoulders are wedge shaped, the deeper portion of the same being at the outer side thereof, or at that end which terminates at the edge of the rim. In mounting the rim on the felly the shoulders on the rim are brought into registration with the recesses formed on the felly and the rim is then slipped onto the felly until the resistance of the shoulders in the recesses prevents further movement of the rim onto the felly. It will be noted that the felly is mounted on the spokes in such a manner that the shoulders on the felly engage in a space between the connecting members 9 of the spoke.

Projected between the said space of every other spoke is a bolt 21 which has an enlarged head 22 which engages against the side of the felly 15. The opposite end of the bolt is threaded and is provided with a suitable nut for drawing the keeper 23 into close engagement with the flange of the rim. When the nut is tightened on the bolt the keeper prevents the removal of the rim from the felly.

Projected through the openings 14 are bolts 24 which project through plates 25 and 25' positioned at opposite sides of the spokes. Nuts 26 are provided to bring said plates into close engagement with the spokes and the plates are formed arcuate, as at 28, to conform to the contour of the spokes at the point of engagement. In this way the spokes are securely held in position at the center of the wheel.

The plates are each provided with an opening 27 in which the bearing for the axle may be mounted.

It is thus seen that I have provided a vehicle wheel in which the spokes are all made from one continuous piece of material and in which a great amount of strength and rigidity is combined. I have also thus provided a simple and efficient means of mounting the rim on the felly of the wheel.

While I have illustrated and described the preferred form of structure I do not wish to limit myself to the precise form of structure shown but desire to avail myself of such variations and modifications as come within the scope of the appended claims.

Having thus described my invention what I claim as new and desire to secure by Letters Patent is:

1. A vehicle wheel comprising a plurality of spokes formed from a continuous strip of material, each spoke consisting of a plurality of parts folded upon themselves and connected at the outer ends thereof to the adjacent spokes on the wheel.

2. A vehicle wheel comprising a plurality of spokes formed from a strip of metal having a portion projecting from each spoke to the adjacent spoke to form a circular portion adapted for attachment to the felly of the wheel.

3. A vehicle wheel comprising a plurality of spokes formed from a strip of continuous metal; an arcuate member projecting from each spoke adjacent the outer end thereof, integral therewith and integral with the adjacent spoke.

4. A vehicle wheel comprising a plurality of spokes formed from a single piece of continuous material; an arcuate member projecting from, and integral with each spoke, connecting the adjacent spoke and integral therewith; and rim supporting means mounted on said arcuate members.

5. A vehicle wheel comprising a plurality of spokes formed from a continuous piece of material; an integral arcuate member projecting from each spoke and connecting the adjacent spoke; rim supporting means mounted on said arcuate members; and a rim on said rim supporting means.

6. A vehicle wheel comprising a plurality of spokes formed from a single piece of continuous material; and means mounted on the centrally disposed ends of said spoke for retaining the same in rigid position.

7. A vehicle wheel comprising a plurality of spokes formed from a single piece of continuous material and having the centrally disposed ends so arranged as to provide for the radiation of the spokes therefrom and to provide for a substantially circular opening therethrough.

8. A vehicle wheel comprising a plurality of spokes integral with each other; means for binding said spokes adjacent their center in rigid position; a felly; and means projecting between said felly and said spokes at intervals for maintaining said spokes in rigid position.

In testimony whereof I have signed the foregoing specification.

JOB DUDLEY.